United States Patent Office 3,366,601
Patented Jan. 30, 1968

3,366,601
RAPID CURING EPOXY RESIN COMPOSITIONS CONTAINING A SUBSTITUTED TRIAZINE AS AN ACCELERATOR
Darryl E. Cragar and David O. Bowen, Lake Jackson, Tex., assignors to The Dow Chemical Company, Midland, Mich., a corporation of Delaware
No Drawing. Filed July 2, 1964, Ser. No. 380,054
8 Claims. (Cl. 260—47)

This invention relates to an epoxy resin composition which can be cured rapidly at elevated temperature to a thermoset resin. These rapid curing resin compositions comprise an epoxy resin having dicyandiamide as a curing agent and a substituted triazine as an accelerator.

Dicyandiamide has been used as a latent curing agent for epoxy resins. There is substantially no reaction between the curing agent and resin over long periods of time at ambient temperatures. The mixture must be heated to a temperature of about 165° C. and held at that temperature for an extended period of time to effect the cure. The rate of cure increases with temperature up to about 210–220° C. where the cure is almost instantaneous. The rate of cure can be accelerated or otherwise modified with amines, amides, quaternary ammonium compounds and certain substituted melamines.

We have found that the cure of epoxy resins with dicyandiamide can be accelerated with certain substituted symmetrical triazines. More particularly, we have found that the temperature range at which an instantaneous cure is obtained can be controlled by either the concentration of the triazine or its molecular substitution. Thus, our invention enables the curing of epoxy resins with dicyandiamide as a latent curing agent with the ability to decrease the temperature at which the latent curing agent produces an instantaneous cure.

The substituted symmetrical triazines which can be used in accordance with this invention may be represented by the following general formula:

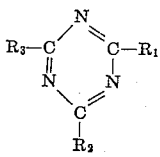

where $R_1$, $R_2$ and $R_3$ independently may be either aziridinyl or dialkylamino with each alkyl containing from one to ten carbon atoms. Specific compounds having this general formula are:

2(1-aziridinyl)-4,6-bis(dimethylamino)-s-triazine;
2,4-bis(1-aziridinyl)-6-(dimethylamino)-s-triazine;
2,4,6-tris(1-aziridinyl)-s-triazine; and
2,4,6-tris(dimethylamino)-s-triazine.

Dicyandiamide has been useful as a latent curing agent for all of the common epoxy resins. The substituted triazines may be used according to this invention to accelerate the cure of any of these dicyandiamide-epoxy resin systems. Among the epoxy resins which may be cured with this combination of agents are the polyglycidyl derivatives of (1) dihydric phenols; (2) alkyl substituted dihydric phenols; (3) halogen substituted dihydric phenols; (4) bisphenols represented by the formula:

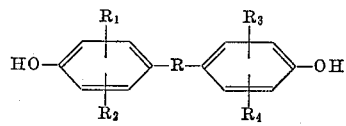

where R is selected from the group consisting of alkylene,

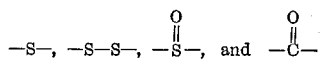

(5) polyoxyalkylene glycols; (6) the condensation products of formaldehyde and phenol, alkyl substituted phenols or halogen substituted phenols; and (7) aromatic amines; and $R_1$, $R_2$, $R_3$ and $R_4$ are independently selected from the group consisting of hydrogen and halogen.

The temperatures at the peak exotherms of epoxy resins cured according to this invention were determined on a differential thermal analyzer in a manner similar to that described by H. C. Anderson in Analytical Chemistry 32, 12, 1592–5 (1960). These temperatures, which correspond to that at which the maximum rate of reaction is obtained, are equal to the temperatures at which the reaction becomes instantaneous. Methods in which these resins can be prepared are illustrated in the following examples.

Example 1

An epoxy resin comprising a diglycidyl ether of 2,2-bis(4-hydroxyphenyl)propane having an epoxide equivalent weight of 186–192 and a viscosity of 11,000–14,000 cps. at 25° C. was cured with various mixtures of dicyandiamide and a substituted triazine. The resin mixtures were cured in a differential thermal analyzer heated at the rate of 20° C. per minute and the peak exotherm recorded. The resin mixtures were prepared by adding 2 grams of the substituted triazine to 40 grams of a 5 percent solution of dicyandiamide in methanol and stirring until the triazine was completely dissolved. This solution of accelerators was added to a flask containing 25 grams of the diglycidyl ether. The flask was then placed on a Roto film evaporator and all of the solvent removed at room temperature or below. The solvent-free samples were then run in the different thermal analyzer. The temperatures at the peak exotherms for samples containing the various substituted triazines are listed in Table 1.

TABLE 1

Peak exotherms of epoxy resins cured with dicyandiamide and a substituted triazine

| Accelerator: | Temp. at peak exotherm, ° C. |
|---|---|
| I | 154 |
| III | 183 |
| IV | 192 |
| None | 210 |

I—2-(1-aziridinyl)-4,6-bis(dimethylamino)-s-triazine
III—2,4,6-tris(1-aziridinyl)-s-triazine
IV—2,4,6-tris(dimethylamino)-s-triazine

Example 2

A diglycidyl ether of 2,2-bis(4-hydroxyphenyl)-propane, commonly known as the diglycidyl ether of bisphenol A, and having an epoxide equivalent weight of 182–189 and a viscosity of 7000–10,000 cps. at 25° C., was mixed with dicyandiamide and the triazine accelerator on a roll mill then cured in a differential thermal analyzer to determine the peak exotherm temperature, with the sample heated at 20° C. per minute. Each of these samples was prepared from 88.7 grams of a mixture containing 48 grams of the diglycidyl ether and 40.7 grams of inert fillers, extenders and modifiers, together with various amounts of the dicyandiamide and accelerator to illustrate the ability to control the temperature at which instantaneous cure occurs, i.e. the peak exotherm. The temperatures of the peak exotherms found for these resin mixtures are reported in Table 2.

TABLE 2
*Peak exotherms of milled resin mixtures*

| Dicyandiamide, grams | Accelerator, | grams | Temp. at Peak Exotherm, ° C. |
|---|---|---|---|
| 4 | II | 4 | 175 |
| 4 | II | 3 | 179 |
| 4 | II | 2 | 186 |
| 4 | II | 1 | 190 |
| 3 | II | 3 | 182 |
| 2 | II | 2 | 188 |
| 2 | II | 3 | 182 |
| 2 | II | 4 | 172 |
| 4 | IV | 4 | 192 |
| 4 | IV | 2 | 194 |
| 4 | I | 4 | 162 |

I—2-(1-aziridinyl)-4,6-bis(dimethylamino)-s-triazine.
II—2,4-bis(1-aziridinyl)-6-(dimethylamino)-s-triazine.
IV—2,4,6-tris(dimethylamino)-s-triazine.

Example 3

Samples were prepared by mixing 48 grams of a diglycidyl ether of bisphenol A having an epoxide equivalent weight of 182–189 and a viscosity of 700–10,000 cps. at 25° C. with varying quantities of dicyandiamide as curing agent and 2-(1-aziridinyl)-4,6-bis(dimethylamino)-s-triazine as the accelerator, using a spatula to produce a uniform mixture. The samples were then run on a differential thermal analyzer with the heating rate being 20° C. per minute. The temperatures at the peak exotherms of these samples are reported in Table 3.

TABLE 3
*Peak exotherms of resin mixtures*

| Dicyandiamide, grams | Accelerator, grams | Temp. at Peak Exotherm, ° C. |
|---|---|---|
| 5 | 1 | 186 |
| 4 | 2 | 178 |
| 4 | 3 | 169 |
| 4 | 4 | 165 |
| 4 | 5 | 160 |
| 3 | 3 | 170 |
| 3 | 4 | 166 |
| 3 | 5 | 162 |
| 2 | 4 | 165 |
| 2 | 5 | 164 |
| 1 | 5 | 160 |

The data presented in Tables 1, 2 and 3 illustrate the ability of these accelerators to lower the temperature at which the peak exotherm occurs in the curing of an epoxy resin with dicyandiamide. Some of the accelerators depress the peak temperature more than others. Also, the amount of depression is proportional to the amount of accelerator used with given amounts of resin and dicyandiamide curing agent. Thus, the desired temperature of the peak exotherm, i.e. the temperature at which an instantaneous cure is effected, may be obtained by the proper choice of accelerator and its concentration.

A latent cure of these epoxy resins can be obtained with about 2–10 parts of dicyandiamide per hundred parts resin (phr.). Between about 2 and 10 phr. and preferably 7 to 9 phr. of the triazine accelerator can be used with these latent curing resin systems.

These resins may be used in any of the applications where a high temperature latent cure is desired. They are particularly suitable as metal adhesives, reinforced plastics, coatings, potting compounds, and the like. The resin may be applied to the substratum as a solution then the solvent removed prior to the latent cure.

We claim:

1. An accelerated latent curing epoxy resin mixture wherein the resin contains more than one glycidyl group per molecule; said mixture containing from 2 to 10 parts of dicyandiamide per hundred parts of said resin as a latent curing agent together with from 2 to 10 parts per hundred parts of resin of an accelerator comprising a substituted triazine having the general formula

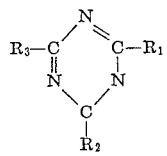

where $R_1$, $R_2$, and $R_3$ independently may be selected from the group consisting of aziridinyl and dialkylamino with each alkyl containing from one to ten carbon atoms.

2. An accelerated latent curing epoxy resin mixture wherein the resin contains more than one glycidyl group per molecule, said mixture containing from 2 to 10 parts of dicyandiamide per hundred parts of resin together with from 2 to 10 parts per hundred parts of resin of 2(1-aziridinyl)-4,6-bis(dimethylamino)-s-triazine.

3. An accelerated latent curing epoxy resin mixture wherein the resin contains more than one glycidyl group per molecule, said mixture containing from 2 to 10 parts of dicyandiamide per hundred parts of resin together with from 2 to 10 parts per hundred parts of resin of 2,4-bis(1-aziridinyl)-6-(dimethylamino)-s-triazine.

4. An accelerated latent curing epoxy resin mixture wherein the resin contains more than one glycidyl group per molecule, said mixture containing from 2 to 10 parts of dicyandiamide per hundred parts of resin together with from 2 to 10 parts per hundred parts of resin of 2,4,6-tris(1-aziridinyl)-s-triazine.

5. A resin mixture according to claim 1 wherein said substituted triazine is 2,4,6-tris(dimethylamino)-s-triazine.

6. An accelerated latent curing resin mixture comprising:
   a diglycidyl ether of 2,2-bis(4-hydroxyphenyl)-propane having an epoxide equivalent weight between 186 and 192 and a viscosity between 11,000 and 14,000 cps. at 25° C.;
   from about 2 to about 10 parts of dicyandiamide per hundred parts of said diglycidyl ether as a latent curing agent; and
   from about 7 to about 9 parts per hundred parts of said diglycidyl ether of 2(1-aziridinyl)-4,6-bis(dimethylamino)-s-triazine as an accelerator for said latent curing agent.

7. A resin mixture according to claim 1 wherein said epoxy resin is selected from the group consisting of glycidyl polyethers of dihydric phenols, polyoxyalkylene glycols, and polyhydric novolac resins prepared by the condensation of formaldehyde and phenols.

8. The epoxy resin composition of claim 7 wherein the dihydric phenols are bisphenols represented by the formula

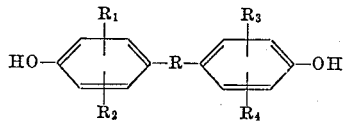

where R is selected from the group consisting of alkylene, —S—, —S—S—, $-\overset{O}{\underset{\parallel}{S}}-$ and $-\overset{O}{\underset{\parallel}{C}}-$ and $R_1$, $R_2$, $R_3$ and $R_4$ are independently selected from the group consisting of hydrogen and halogen.

References Cited

UNITED STATES PATENTS

| | | | |
|---|---|---|---|
| 2,784,166 | 3/1957 | Wohnsiedler et al. | 260—2 XR |
| 3,030,247 | 4/1962 | Schurb | 260—47 |

OTHER REFERENCES

Lee et al.: "Epoxy Resins," p. 15 relied on, McGraw-Hill Book Co., Inc., New York, 1957.

WILLIAM H. SHORT, *Primary Examiner.*

SAMUEL H. BLECH, *Examiner.*

T. D. KERWIN, *Assistant Examiner.*